United States Patent [19]

Kenan et al.

[11] Patent Number: 4,561,728

[45] Date of Patent: * Dec. 31, 1985

[54] ELECTROOPTICAL COMPARATORS

[75] Inventors: Richard P. Kenan, Upper Arlington; Carl M. Verber, Columbus, both of Ohio

[73] Assignee: Battelle Memorial Institute, Columbus, Ohio

[*] Notice: The portion of the term of this patent subsequent to Oct. 1, 2002 has been disclaimed.

[21] Appl. No.: 344,116

[22] Filed: Jan. 29, 1982

[51] Int. Cl.⁴ .............................................. G02F 1/03
[52] U.S. Cl. ................................................... 350/356
[58] Field of Search ............................. 350/356, 96.14

[56] References Cited

U.S. PATENT DOCUMENTS

| | | | |
|---|---|---|---|
| 4,364,633 | 12/1982 | Verber et al. | 350/96.14 |
| 4,396,246 | 8/1983 | Holman | 350/96.14 |
| 4,403,833 | 9/1983 | Kenan et al. | 350/356 |
| 4,415,226 | 11/1983 | Verber et al. | 350/162.13 X |

OTHER PUBLICATIONS

Taylor, "Integrated Optical Logic Circuits", Conference on Integrated & Guided Wave Optics, Utah, Jan. 1978.

Kotani et al., "Electrooptic . . . Waveguides", IEEE Journal of Quantum Elec., vol. QE-15, No. 5, May 1979.

Primary Examiner—John K. Corbin
Assistant Examiner—Vincent J. Lemmo
Attorney, Agent, or Firm—Philip M. Dunson

[57] ABSTRACT

Apparatus receives light (11) in an input direction (12) and controls the directions in which portions of it travel through adjacent regions (13,14,15,16) in a waveguide (19) to emerge (at 17) in an output direction (18) with intensity responsive to a plurality of electrical potential differences (A1-A2, etc.). A plurality of electrooptic reflective means (20), each comprising a pair of electrodes (21,22, etc.), with each reflective means (20A,20B,20C,20D) on a different region (13,14,15,16), form a separate Bragg grating in each region with a direction of Bragg incidence in the input direction (12). A prism (29) directs light (11) from a laser (30) to enter in the input direction (12) into each electrooptic means (20). A plurality of control means (A,B,C,D), one for each region, each comprising means for applying a first electrical potential (A1,B1,C1, or D1) to the first electrode (21,23,25, or 27) and means for applying a second electrical potential (A2,B2,C2, or D2) to the second electrode (22,24,26, or 28) of the electrooptic reflective means (20A,20B,20C, or 20D) in the individual region (13,14,15, or 16), further direct a portion of the light (11) entering into the individual region (13, etc.) by providing a Bragg reflection thereof beyond the region (as at 17) in the output direction (18) to output means (32,33), which receive the light (17) and respond to it.

22 Claims, 1 Drawing Figure

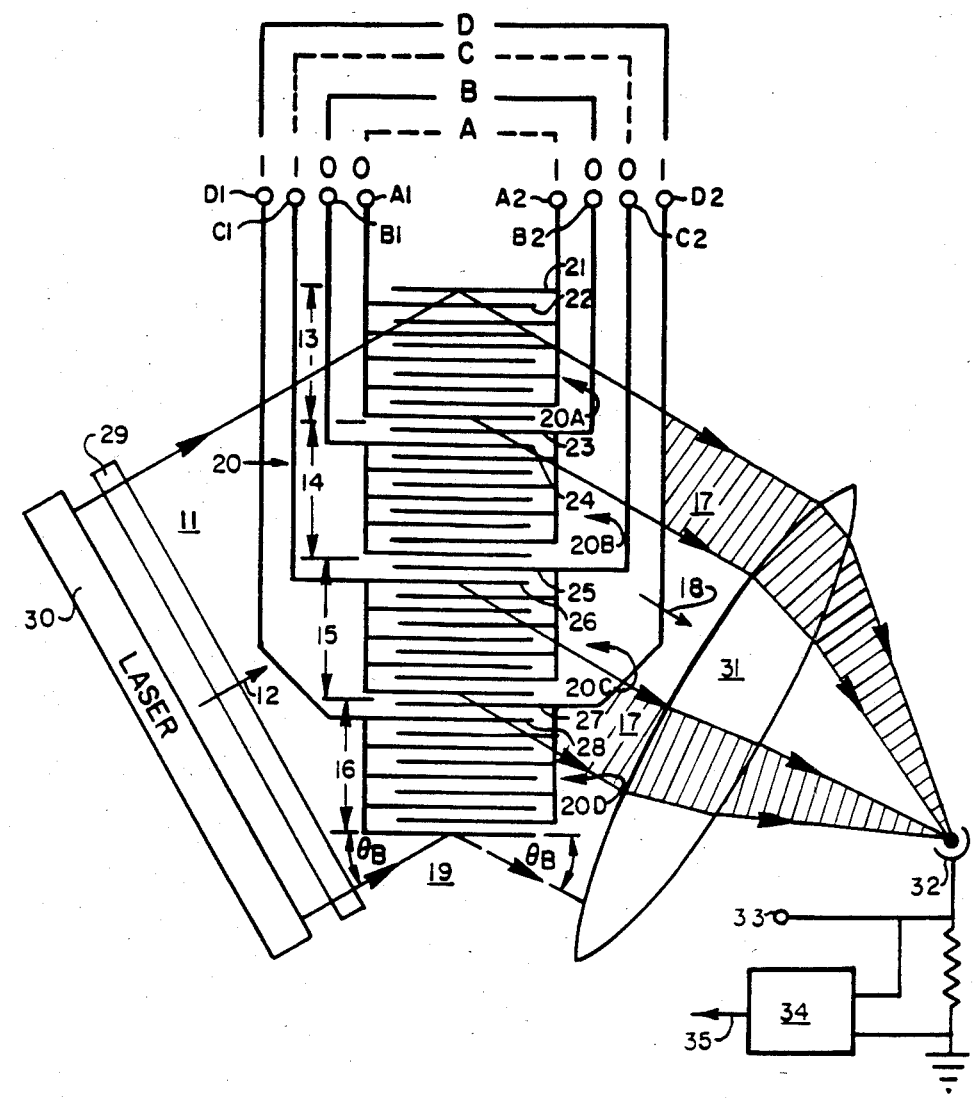

ELECTROOPTICAL COMPARATORS

The Government has rights in this invention pursuant to Contract No. F49620-79-C-0044 awarded by Air Force Office of Scientific Research.

FIELD

This invention relates to apparatus for receiving light entering in a predetermined input direction and controlling the directions in which portions of the light travel through regions thereof so as to emerge therefrom in a selected output direction with intensity responsive to a plurality of electrical potential differences.

Such apparatus, according to the present invention, typically comprises an electrooptic waveguide, a plurality of electrooptic reflective means, each comprising a pair of electrodes, with each reflective means on a different region in the waveguide, for forming a separate Bragg grating in each region positioned with a direction of Bragg incidence in each grating approximately in the predetermined input direction, each region being adjacent to and in tandem with another region, light input means for directing light of known or controlled intensity to enter approximately in the predetermined input direction into each electrooptic means, a plurality of control means, one for each region, each comprising means for applying a first electrical potential to the first electrode and means for applying a second electrical potential to the second electrode of the electrooptical reflective means in the individual region, to further direct a portion of the light entering into the individual region by providing a Bragg reflection thereof beyond the region in the selected output direction, and output means for receiving the light travelling beyond each region in the selected output direction and for responding thereto.

The terms "reflect", "reflective", etc. are used herein broadly to relate to any changing of direction or bending of the general type commonly provided by mirrors, gratings, beam splitters, and the like. In the Bragg gratings and beam splitters employed in typical embodiments of the present invention, the reflections are of course provided by the phenomenon more particularly called diffraction. So the words "reflection" and "diffraction", and their corresponding verbs, adjectives, etc., can be considered to be substantially synonyms as used herein, especially in describing and defining typical features of the invention.

The term "IOC" is used herein as an abbreviation or acronym for "integrated optical circuit".

The present invention is related to the subject matter of our copending U.S. patent applications Ser. No. 221,956, filed Dec. 31, 1980, for Controlling Light, now U.S. Pat. No. 4,415,226, issued Nov. 15, 1983; Ser. No. 293,779, filed Aug. 18, 1981, for Electrooptical Multipliers, now U.S. Pat. No. 4,403,833, issued Sept. 13, 1983; and Ser. No. 130,329, filed Mar. 14, 1980, for Pairwise Comparison, now U.S. Pat. No. 4,364,633, issued Dec. 21, 1982. Said applications are assigned to the assignee of the present invention.

The electrooptic components employed in typical embodiments of the present invention are now well known. Convenient ways of making them are described in the above mentioned patent applications and in the references cited herein.

Typical embodiments of the invention comprise apparatus for pairwise comparison of quantities such as numbers, components of vectors, physical properties, and any other computable or measurable quantities. Each quantity is converted into a voltage, and two sets of voltages having one-to-one correspondence (for each voltage in the first set there exists exactly one corresponding voltage in the second set, and for each voltage in the second set there exists exactly one corresponding voltage in the first set) are connected to the apparatus. The apparatus provides an indication that is a function of the relative magnitudes of each pair of corresponding voltages in the two sets (the algebraic difference between the first voltage of the first set and the first voltage of the second set, and so on for the second voltage in each set, the third voltage in each set, etc., to the last voltage in each set). The indication provided by the apparatus can be such as to be useful in computations such as vector or scalar subtraction (or addition, with the voltages in one set reversed), computing the proximities of sets of quantities, comparing such proximities, indicating whether sets are approximately identical, and various other information generating and processing operations.

BACKGROUND

A major problem associated with the earth resources monitoring programs is the enormous amount of data that is collected by the monitoring instruments and transmitted to earth from the remote sensor platforms. The quantity of the data is such that its timely analysis is a severe problem, a problem that will be compounded as more sophisticated, higher resolution sensors are employed. If we consider systems having as their purpose feature identification by means of the intensity or ratio of intensities of reflected solar radiation in a number of wavelength bands, then there are a number of approaches to cutting down the data load which might be considered. One obvious approach is to halt data transmission if it is determined that data are uninteresting. Thus, a device that recognizes the presence of excessive cloud cover can signal a halt to data transmission. Similarly, a device that recognizes clear sea water can be used to interrupt data transmission if only departures from clear water are sought.

A more sophisticated function that the editing function described above is that of remote feature identification in real time. If this is accomplished then feature identification rather than raw multispectral data can be transmitted, and an enormous reduction is achieved in the time between data acquistion and utilization.

A typical embodiment of the present invention comprises an integrated optical data preprocessor for multispectral data. The device compares received analog signals in many channels with a large set of prerecorded data sets in real time, and classifies the received data on the basis of the comparison. The prototype is a multichannel integrated optical data processor utilizing optical subtraction techniques to take a "vector difference" to two sets of analog voltages. It includes a large set of signal electrodes and a similar set of reference electrodes.

DISCLOSURE

Apparatus according to the present invention typically comprises an electrooptic waveguide upon which is placed an array of interdigital electrodes similar to those shown in the drawing. When any element of this array is actuated by the application of a voltage difference between its two electrodes, a phase grating is induced into the waveguide underneath that can efficiently diffract light incident upon it at the correct (Bragg) angle. If the generally upper electrodes of the array are actuated with voltages $V_1, V_2, \ldots$, and the corresponding generally lower electrodes of the array are actuated with voltages $V_1', V_2', \ldots$, then light diffracted from each array element has intensity given by $$I_j = \eta_j \times I_o$$

for the j-th element, where $I_o$ is the incident intensity, and $\eta_j$ is the efficiency of the grating induced by $V_j - V_j'$. The efficiency of an induced grating is $$\eta = \sin^2(\alpha V)$$

where $\alpha$ is a constant, independent of V, and V is the applied voltage difference. For small signals, the diffracted beam from element j will have intensity proportional to $(V_j - V_j')^2$, so summing over j will give an intensity proportional to the square of vector difference magnitude, $(\vec{V} - \vec{V}')^2$. Here $\vec{V}$ and $\vec{V}'$ are the vectors whose components are the voltages $V_j$ and $V_j'$ applied to the array elements. If the electrodes are biased to the inflection point of the grating response curve (efficiency-vs-voltage), then for small signals the output from an element will be a linear function of the difference of the voltages; i.e., for element j, $$I_j = A + B(V_j - V_j'),$$

where A and B are constants. The linear portion of this output intensity is electronically separable, and the summation of these parts is also separable.

Typical apparatus according to the present invention for receiving light entering in a predetermined input direction therein and controlling the directions in which portions of the light travel through regions thereof so as to emerge therefrom in a selected output direction with intensity responsive to a plurality of electrical potential differences, comprises an electrooptic waveguide; a plurality of electrooptic reflective means, each comprising a pair of electrodes, with each reflective means on a different region in the waveguide, for forming a separate Bragg grating in each region positioned with a direction of Bragg incidence in each grating approximately in the predetermined input direction, each region being adjacent to and in tandem with another region; light input means for directing light of known or controlled intensity to enter approximately in the predetermined input direction into each electrooptic means; a plurality of control means, one for each region, each comprising means for applying a first electrical potential to the first electrode and means for applying a second electrical potential to the second electrode of the electrooptical reflective means in the individual region, to further direct a portion of the light entering into the individual region by providing a Bragg reflection thereof beyond the region in the selected output direction; and output means for receiving the light travelling beyond each region in the selected output direction.

The first electrode of each electroopical reflective means typically comprises a first set of substantially straight and parallel, thin, elongate, electrically conductive members connected together at one end, and the second electrode of each electrooptic reflective means typically comprises a second set of substantially straight and parallel, thin, elongate, electrically conductive members, interleaved with the first set, insulated therefrom, and connected together at the opposite end.

Typically the plurality of electrooptic reflective means are positioned with their electrodes all approximately parallel to each other, and the electrodes of each individual electrooptic reflective means are insulated from the electrodes of the other individual electrooptic reflective means. Each individual electrooptic reflective means typically is substantially identical to each of the other individual electrooptic reflective means. Where differences in weighting are desired, however, the size of at least one individual electrooptic reflective means may differ from the size of at least one other individual electrooptic reflective means.

The output means typically includes means for providing an electric signal of amplitude responsive to the intensity of the light travelling beyond each region in the selected output direction. The output means may comprise means for receiving the light travelling beyond each region in the selected output direction and directing substantially all of it to means for providing an electric signal of amplitude responsive to the intensity of the light and thus providing an indication responsive to the sum of the absolute values of the potential differences on the individual control means. In some typical embodiments of the invention the output means comprises a plurality of means, each comprising means for receiving the light travelling beyond a different region or regions in the selected output direction and directing substantially all of it to means for providing an electric signal of amplitude responsive to the intensity of the light. In others the output means comprises means for imaging the output light from the individual regions onto photoelectric means.

Typically individual potentials comprising analogs of the individual component values of a first selected vector are connected to the first electrode of each respective electrooptic reflective means, and individual potentials comprising analogs of the individual component values of a second selected vector are connected to the second electrode of each respective electrooptic reflective means.

DRAWING

The figure is a schematic plan view of typical apparatus according to the present invention.

CARRYING OUT THE INVENTION

Referring now to the drawing, typical apparatus according to the present invention for receiving light 11 entering in a predetermined input direction 12 therein and controlling the directions in which portions of the light travel through regions 13,14,15,16 thereof so as to emerge, as at 17, therefrom in a selected output direction 18, with intensity responsive to a plurality of electrical potential differences A1−A2, etc., comprises an electrooptic waveguide 19, a plurality of electrooptic reflective means 20, each comprising a pair of electrodes 21,22, etc. with each reflective means 20A,20B,20C,20D on a different region 13-16 in the waveguide 19, for forming a separate Bragg grating 20A,20B,20C,20D in each region 13-16 positioned with a direction of Bragg incidence in each grating approximately in the predetermined input direction 12, each region 13-16 being adjacent to and in tandem with another region 13-16; light input means 29, such as a prism, grating, or polished waveguide edge, for directing light 11 of known or controlled intensity (as from a laser 30, or other suitable light source; and collimating means, not shown) to enter approximately in the predetermined input direction 12 into each electrooptic means 20A,20B,20C,20D; a plurality of control means A,B,C,D for applying a first electrical potential A1,B1,C1, or D1 to the first electrode 21,23,25, or 27 and means for applying a second electrical potential A2,B2,C2, or D2 to the second electrode 22,24,26, or 28 of the electrooptical reflective means 20A,20B,20C, or 20D in the individual region 13,14,15, or 16, to further direct a portion of the light 11 entering into the individual region 13, etc. by providing a Bragg reflection thereof beyond the region 13, etc. in the selected output direction 18; and output means 31,32 for receiving the light 17 travelling beyond each region (13,15 as shown in the drawing) in the selected output direction 18.

As the drawing shows schematically, the first electrode 21,23,25,27 of each electrooptical reflective means 20A,20B,20C,20D typically comprises a first set of substantially straight and parallel, thin, elongate, electrically conductive members connected together at one end, and the second electrode 22,24,26,28 of each electrooptic reflective means 20A, etc. comprises a second set of substantially straight and parallel, thin, elongate, electrically conductive members, interleaved with the first set, insulated therefrom, and connected together at the opposite end. The plurality of electrooptic reflective means 20A, etc. typically are positioned with their electrodes 21-28 all approximately parallel to each other, as shown in the drawing; and the electrodes 21,22;23,24;25,26;27,28 of each individual electrooptic reflective means 20A;20B;20C;20D are insulated from the electrodes 21,22; etc. of the other individual electrooptic reflective means 20A; etc.

Each individual electrooptic reflective means 20A, etc. typically is substantially identical to each of the other individual electrooptic reflective means 20A etc. as shown in the drawing. Where differences in weighting are desirable, however, the size of at least one individual electrooptic reflective means 20A,20B,20C,20D may differ from the size of at least one other individual electooptic reflective means 20A,20B,20C,20D. For example, if the terminals A1 and B1 are connected together and the terminals A2 and B2 are connected together, then an electrooptic reflective means 20A20B is formed that is twice as long as the electrooptic reflective means 20C, and twice as long as the electrooptic reflective means 20D. Thus for a given voltage difference at its terminals A1B1 and A2B2 the longer electrooptic reflective means 20A20B reflects approximately twice as much light as would either the electrooptic reflective means 20C or the electrooptic reflective means 20D, and the relative weightings of the input voltage differences AB, C, and D are 2, 1, and 1, respectively. In other words, their relative effects on the total output light 17 are 2, 1, and 1, respectively.

The output means 31,32 typically includes means 32 for providing an electric signal, at 33, of amplitude responsive to the intensity of the light 17 travelling beyond each region 13, etc. in the selected output direction 18. Typically the output means 31,32 comprises means such as a lens 31 for imaging the total output light 17 from the various individual regions 20A, etc. onto photoelectric means 32. In some typical embodiments, as shown in the drawing, the output means 31,32 comprises means such as the lens 31 for receiving the light 17 travelling beyond each region 13, etc. in the selected output direction 18 and directing substantially all of it to means such as a photoelectric cell 32 for providing an electric signal at 33 of amplitude responsive to the intensity of the light and thus providing an indication responsive to the sum of the absolute values of the potential differences $|A1-A2|$, etc. on the individual control means A,B,C,D. In other typical embodiments of the invention the output means comprises a plurality of means 31,32, each comprising means such as the lens 31 for receiving the light 17 travelling beyond a different region or regions 20A, etc. in the selected output direction 18 and directing substantially all of it to means such as the photoelectric cell 32 for providing an electric signal, as at 33 or 35, of amplitude responsive to the intensity of the light 17.

Typically individual potentials A2,B2,C2,D2 comprising analogs of the individual component values of a first selected vector are connected to the first electrode 21, 23,25,27 of each respective electroopic reflective means 20A,20B,20C,20D, and individual potentials A1,B1,C1,D1 comprising analogs of the individual component values of a second selected vector are connected to the second electrode 22,24,26,28 of each respective electrooptic reflective means 20A,20B,20C,20D.

In some typical embodiments of the invention, each control means A,B,C,D comprises means for providing a fixed component of potential difference (such as from a direct voltages source, not shown) between the first and second electrodes 21,22; etc. such as to bias them to a value where the grating response is approximately a linear function of potential difference within a known range, and a variable component of potential difference (such as from a fixed frequency oscillator, amplitude modulated by the desired signal voltage, not shown) within the range of the approximately linear response function; whereby the intensity of the light 17 emerging in the selected output direction 18 includes a part that is approximately a linear function of the sum of the variable components of potential difference provided by the individual control means A,B,C,D.

Some such embodiments typically comprise also means 32 for providing an electric signal of amplitude responsive to the intensity of the light 17 emerging in the selected output direction 18, such that a part of the electric output signal at 33 is approximately a linear function of the sum of the variable components of potential difference provided by the individual control means.

In typical embodiments of the invention for use in digital data processing equipment, each individual control means A,B,C,D comprises means (such as any suitable binary digital logic circuitry, not shown) for providing selectively either approximately zero potential difference or approximately a predetermined finite potential difference between the electrodes 21,22, etc.; whereby the intensity of the light 17 emerging in the selected output direction 18 at a given instant is either approximately zero or approximately an output value that is a function of the number of finite potential differences provided by the individual control means A,B,C,D.

In typical analog processing apparatus according to the invention each control means A,B,C,D typically comprises means for providing a potential difference (such as from an analog electrical voltage source, not shown) within a range wherein the grating response is approximately a quadratic function of potential difference.

Apparatus according to the present invention is especially useful for comparing first and second sets of voltages having one-to-one correspondence, and providing an indication responsive to the magnitudes of the pairwise differences of the voltages. In apparatus that is so used, the control means A,B,C,D typically comprise means for connecting each voltage of the first set at A2,B2,C2,D2 to the first electrode 21,23,25,27 of one electroopic reflective means 20A,20B,20C,20D and means for connecting each voltage of the second set at A1,B1,C1,D1 to the second electrode 22,24,26,28 of the electrooptic reflective means 20A, etc. to the first electrode 21, etc. of which the corresponding voltage of the first set is connected; and the output means 31,32 typically comprises means 32 responsive to the light 17 travelling beyond each region 20A, etc. for providing an indication at 33 that is a function of the pairwise relative magnitudes of the first set of voltages and the second set of voltages.

Where the apparatus is used for providing an indication of whether the sets are approximately identical, the means responsive to the light 17 travelling beyond each region comprises means (such as the detector 32 and associated circuitry 34,35) for providing an indication when the first set of voltages is within a selected close approximation to the second set of voltages.

The apparatus may be used for comparing a first set of voltages at A2, etc. with each of a plurality of second sets of voltages at A1, etc; and it then typically comprises means for connecting each second set to the corresponding second electrodes 22,24,26,28 at a different instant while the first set is connected to the corresponding first electrodes 21,23,25,27; and the means responsive to the light 17 travelling beyond each region 20A, etc. comprises means (such as the detector 32 and associated circuitry 34,35) for determining how closely each second set approximates the first set. The means 32,34,35 responsive to the light 17 travelling beyond each region 20A, etc. may comprise also means for indicating which, if any, of the second sets of voltages are within a selected close approximation to the first set of voltages. Alternatively, or additionally, the means 32,34,35 responsive to the light 17 travelling beyond each region 20A, etc. may comprise also means for comparing the respective closenesses, and means for indicating which second set most closely approximates the first set.

Where the apparatus is used for providing an indication that is a function of the magnitude of the difference of two vectors, the vectors may be represented by analogs comprising a first set of voltages proportional to the respective components of one vector and a second set of voltages proportional to the respective components of the other vector. Similarly, where the apparatus is used for providing an indication that is a function of the algebraic sum of the pairwise algebraic differences between two sets of numbers having one-to-one correspondence, the numbers may be represented by analogs comprising a first set of voltages proportional to the respective numbers in one set and a second set of voltages proportional to the respective numbers in the other set.

The typical input to the device is two voltage sets $\{V_R\}$ and $\{V_S\}$, each corresponding to a vector in an N-dimensional space. The light intensity at the detector 32 is described by the equation $$I = I_o \sum_{i=1}^{N} \sin^2 a(V_{Si} - V_{Ri} - V_o)$$

where $V_o$ is a uniform bias voltage, and $I_o$ is the intensity incident on each element of the array. Examination of the above equation reveals several modes of operation of the device.

I. Identification Mode A.

If $V_o = 0$ then the condition $I = 0$ obtains only when $V_{Si} = V_{Ri}$ for all i. If a reference set $\{V_R\}$ is imposed upon the reference electrodes 21,23,25,27, then incoming signal sets, connected to the signal electrodes 22,24,26,28 can be compared to this reference set and those signal sets that are equal to the reference set within a given limit (i.e., a $(V_{Si} - V_{Ri})^2 \leq L$) can be identified.

II. Identification Mode B.

In a fashion similar to that of Identification Mode A, a single signal set $\{V_S\}$, can be compared to a large number of reference sets $V_{Rj}$, j=1 ... M. Using conventional electronic circuitry 34, the smallest value of difference intensity resulting from the subtraction can be identified at an output 35, which may provide a digital printout, an analog signal, or any other convenient identifying response. In this manner, the signal can be identified as being most similar to one member of the set of reference sets. This mode of operation requires a library of reference sets which can rapidly be applied to the reference electrodes in sequence. An advantage of the invention is derived from the parallel application of these voltages and the speed at which the optical comparison is performed.

III. Vector Subtraction.

Using standard trigonometric identities and expansions it can be shown that for $V_o = 0$ and $|a(V_{Si} - V_{Ri})| << 1$ for all i=1... N, the following equation can be written:

$$I = I_o \sum_{i=1}^{N} a^2(V_{Si} - V_{Ri})^2 \equiv d^2.$$

If we regard $\{V_{Si}\}$ and $\{V_{Ri}\}$ as vectors in N dimensional space, then d is the "distance" between, or the magnitude of the difference of, the two vectors. This illustrates the vector subtraction mode of the invention.

IV. Scalar Subtraction.

Again, using appropriate trigometric identities and expansions, we find that for $2a V_o = \pi/2$ and $|2a(V_{Si} - V_{Ri})| << 1$, the following equation is derived:

$$I = \frac{I_o}{2}\left[\sum_{i=1}^{N} 1 - k(V_{Si} - V_{Ri})\right]$$

If the output of the apparatus is defined to be the signal $$S = \frac{1}{a}\left[\frac{N}{2} - \frac{I}{I_o}\right] = \sum_{i=1}^{N} V_{Si} - \sum_{i=1}^{N} V_{Ri}$$

then we can determine the difference between the sums of the signal and reference voltages. Note that in this case the signal can be positive or negative.

The drawing illustrates an example of digital data processing with binary inputs of 0,0,1, and 1 to the left side set of input terminals A1,B1,C1, and D1, respectively, with binary inputs of 1,0,0, and 1 to the right side terminals A2,B2,C2, and D2, respectively. Each 0 represents the same electrical potential and each 1 represents the same electrical potential, but different from the potential represented by 0.

A. Since the input potential at A1 is 0 and the input potential at A2 is 1, a predetermined finite potential difference is present between the electrodes 21 and 22 of the uppermost electrooptic reflective means 20A. So a Bragg grating is formed in the upper region 13, causing light to be reflected therefrom, as indicated at 17 in the upper right portion of the drawing; and this light is focused by the lens 31 onto the photoelectric means 32.

B. Since the input potential at the terminal B1 is 0 and the input potential at the terminal B2 also is 0, there is no potential difference between the terminals 23 and 24 of the next electrooptic reflective means 20B in the region 14. So a Bragg grating is not formed in the region 14, and no light is reflected from it.

C. Since the input potential at the terminal C1 is 1 and the input potential at the terminal C2 is 0, the predetermined finite potential difference is present across the terminals 25 and 26 of the next electrooptic reflective means 20C. So a Bragg grating is formed in the region 15, causing light to be reflected therefrom, as indicated at 17 in the lower right portion of the drawings; and this light is focused by the lens 31 onto the photoelectric means 32.

D. Since the input potential at the terminal D1 is 1 and the input potential at the terminal D2 also is 1, there is no potential difference across the electrodes 27 and 28 of the lowest electrooptic reflective means 20D. So a Bragg grating is not formed in the lowest region 16, and no light is reflected therefrom.

Thus the output at 33 (and at 35, if the further processing circuitry 34 is used) indicates two inequalities (exclusive ORs). To make the apparatus respond to equal digital input potentials rather than unequal ones, an inverter (NOT gate) could be inserted between each input potential of one set and its input terminal. (It could be either set, but not both.) For example, if inverters were inserted between the inputs and the terminals on the left side, the inputs at the terminals A1,B1,C1, and D1 would then become 1,1,0, and 0, respectively.

Of course fewer or more electrooptic reflective means 20 can be provided in apparatus according to the present invention, and apparatus of any feasible size can be used for digital or analog processing, or combinations of both.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. Apparatus for receiving light entering in a predetermined input direction therein and controlling the directions in which portions of the light travel through regions thereof so as to emerge therefrom in a selected output direction with intensity responsive to a plurality of electrical potential differences, comprising
   an electrooptic waveguide,
   a plurality of electrooptic reflective means, each comprising a pair of electrodes, with each reflective means on a different region in the waveguide, for forming a separate Bragg grating in each region positioned with a direction of Bragg incidence in each grating approximately in the predetermined input direction, each region being adjacent to and in tandem with another region,
   light input means for directing light of known or controlled intensity to enter approximately in the predetermined input direction into each electrooptic means,
   a plurality of control means, one for each region, each comprising means for applying a first electrical potential to the first electrode and means for applying a second electrical potential to the second electrode of the electrooptical reflective means in the individual region, to further direct a portion of the light entering into the individual region by providing a Bragg reflection thereof beyond the region in the selected output direction, and
   output means for receiving the light travelling beyond each region in the selected output direction.

2. Apparatus as in claim 1, wherein the first electrode of each electrooptical reflective means comprises a first set of substantially straight and parallel, thin, elongate, electrically conductive members connected together at one end, and the second electrode of each electrooptic reflective means comprises a second set of substantially straight and parallel, thin, elongate, electrically conductive members, interleaved with the first set, insulated therefrom, and connected together at the opposite end.

3. Apparatus as in claim 2, wherein the plurality of electrooptic reflective means are positioned with their electrodes all approximately parallel to each other.

4. Apparatus as in claim 2, wherein the electrodes of each individual electrooptic reflective means are insulated from the electrodes of the other individual electrooptic reflective means.

5. Apparatus as in claim 4, wherein each individual electrooptic reflective means is substantially identical to each of the other individual electrooptic reflective means.

6. Apparatus as in claim 4, wherein the size of at least one individual electrooptic reflective means differs from the size of at least one other individual electrooptic reflective means.

7. Apparatus as in claim 1, wherein the output means includes means for providing an electric signal of amplitude responsive to the intensity of the light travelling beyond each region in the selected output direction.

8. Apparatus as in claim 1, wherein the output means comprises means for receiving the light travelling beyond each region in the selected output direction and directing substantially all of it to means for providing an electric signal of amplitude responsive to the intensity of the light and thus providing an indication responsive to the sum of the absolute values of the potential differences on the individual control means.

9. Apparatus as in claim 1, wherein the output means comprises a plurality of means, each comprising means for receiving the light travelling beyond a different region or regions in the selected output direction and directing substantially all of it to means for providing an electric signal of amplitude responsive to the intensity of the light.

10. Apparatus as in claim 1, wherein the output means comprises means for imaging the output light from the individual regions onto photoelectric means.

11. Apparatus as in claim 1, wherein individual potentials comprising analogs of the individual component values of a first selected vector are connected to the first electrode of each responsive electrooptic reflective means, and individual potentials comprising analogs of the individual component values of a second selected vector are connected to the second electrode of each respective electrooptic reflective means.

12. Apparatus as in claim 1, wherein each control means comprises means for providing a fixed component of potential difference between the first and second electrodes such as to bias them to a value where the grating response is approximately a linear function of potential difference within a known range, and a variable component of potential difference within the range of the approximately linear response function; whereby the intensity of the light emerging in the selected output direction includes a part that is approximately a linear function of the sum of the variable components of potential difference provided by the individual control means.

13. Apparatus as in claim 12, comprising also means for providing an electric output signal of amplitude responsive to the intensity of the light emerging in the selected output direction, such that a part of the electric output signal is approximately a linear function of the sum of the variable components of potential difference provided by the individual control means.

14. Apparatus as in claim 1, wherein each individual control means comprises means for providing selectively either approximately zero potential difference or approximately a predetermined finite potential difference between the electrodes, whereby the intensity of the light emerging in the selected output direction at a given instant is either approximately zero or approximately an output value that is a function of the number of finite potential differences provided by the individual control means.

15. Apparatus as in claim 1, wherein each control means comprises means for providing a potential difference within a range wherein the grating response is approximately a quadratic function of potential difference.

16. Apparatus as in claim 1, for comparing first and second sets of voltages having one-to-one correspondence, and providing an indication responsive to the magnitudes of the pairwise differences of the voltages; wherein
the control means comprise means for connecting each voltage of the first set to the first electrode of one electrooptic reflective means and means for connecting each voltage of the second set to the second electrode of the electrooptic reflective means to the first electrode of which the corresponding voltage of the first set is connected; and
the output means comprises means responsive to the light travelling beyond each region for providing an indication that is a function of the pairwise relative magnitudes of the first set of voltages and the second set of voltages.

17. Apparatus as in claim 16, for providing an indication of whether the sets are approximately identical, wherein the means responsive to the light travelling beyond each region comprises means for providing an indication when the first set of voltages is within a selected close approximation to the second set of voltages.

18. Apparatus as in claim 16, for comparing a first set of voltages with each of a plurality of second sets of voltages; comprising means for connecting each second set to the corresponding second electrodes at a different instant while the first set is connected to the corresponding first electrodes; wherein the means responsive to the light travelling beyond each region comprises means for determining how closely each second set approximates the first set.

19. Apparatus as in claim 18, wherein the means responsive to the light travelling beyond each region comprises also means for indicating which, if any, of the second sets of voltages are within a selected close approximation to the first set of voltages.

20. Apparatus as in claim 18, wherein the means responsive to the light travelling beyond each region comprises also means for comparing the respective closenesses, and means for indicating which second set most closely approximates the first set.

21. Apparatus as in claim 16, for providing an indication that is a function of the magnitude of the difference of two vectors, wherein the vectors are represented by analogs comprising a first set of voltages proportional to the respective components of one vector and a second set of voltages proportional to the respective components of the other vector.

22. Apparatus as in claim 16, for providing an indication that is a functon of the algebraic sum of the pairwise algebraic differences between two sets of numbers having one-to-one correspondence, wherein the numbers are represented by analogs comprising a first set of voltages proportional to the respective numbers in one set and a second set of voltages proportional to the respective numbers in the other set.

* * * * *